United States Patent [19]

McClure et al.

[11] 3,854,597
[45] Dec. 17, 1974

[54] AUTOMATIC HOSE CONNECTOR FOR RAILWAY CARS

[75] Inventors: Glenn T. McClure, McKeesport; William K. Mong, Irwin, both of Pa.

[73] Assignee: Westinghouse Air Brake Company, Wilmerding, Pa.

[22] Filed: July 30, 1973

[21] Appl. No.: 383,524

[52] U.S. Cl. .................................. 213/76, 285/12
[51] Int. Cl. .............................. B61g 5/08
[58] Field of Search ....... 285/12, 63, 24, 25, 26–29, 285/305, 307, 317, 70, 71; 213/1.3, 76

[56] References Cited
UNITED STATES PATENTS

| | | | |
|---|---|---|---|
| 3,312,481 | 4/1967 | Temple | 285/12 |
| 3,476,407 | 11/1969 | Temple et al. | 285/12 |
| 3,684,106 | 8/1972 | Baronnet et al. | 213/76 |
| 3,731,953 | 5/1973 | McIntire | 285/12 |

*Primary Examiner*—M. Henson Wood, Jr.
*Assistant Examiner*—Gene A. Church
*Attorney, Agent, or Firm*—R. W. McIntire, Jr.

[57] ABSTRACT

An automatic hose connector for railway cars for automatically connecting the train brake line concurrently with the coupling operation of the cars, said automatic hose connector being characterized by means for delaying locking and sealing engagement with a counterpart hose connector until the cars are effectively coupled and being effective for preventing the sealing gaskets of the respective connectors from making rubbing contact with each other during movement thereof into oppositely facing relation prior to being compressed into sealing engagement by said means. Two coupled hose connectors are also automatically separable upon uncoupling of the coupled cars.

9 Claims, 4 Drawing Figures

3,854,597

AUTOMATIC HOSE CONNECTOR FOR RAILWAY CARS

BACKGROUND OF THE INVENTION

There has always been concern for the safety of crewmen when it is necessary to manually couple and uncouple train hoses, because such action requires the crewman performing such a duty to position himself between the ends of adjacent cars and thus expose himself to the attendant hazards. Moreover, in making up or breaking down a train, much time is consumed in making the manual hose connections by the crewmen.

SUMMARY OF THE INVENTION

The object of the present invention is to provide an automatic hose connector for railway cars which effects coupling and uncoupling of train hoses automatically during coupling and uncoupling, respectively, of the train cars without any assistance on the part of the crewman, and which prevents unnecessary or undue wear of the hose connector sealing gaskets, if they were to rub against each other during such automatic coupling action, by maintaining said gaskets out of contact with each other until they have been placed in an oppositely facing aligned position subsequent to completion of the coupling action.

Briefly, the automatic hose connector embodying the invention comprises a mating head suspended underneath the car coupler and supporting therein a hose connector for connecting with the hose connector on a counterpart mating head. The mating head is flexibly supported in a normal, aligned position and is provided with a conventional pin and gathering-funnel arrangement for guiding the head into engagement with the counterpart mating head. The connector end, in which the sealing gasket is disposed, is provided with an arcuate cam portion, is rotatably mounted in the connector head, and is operated to a locking and sealing position relative to the connector end on the counterpart head by a spring actuated lever, said spring being compressed during the initial coupling action and subsequently acting on said lever for effecting rotation of the connector end, concurrently with rotation of the connector end on said counterpart head, for locking the two connector ends together, said cam portion, at the same time, causing the two gaskets to be brought into a compressed relationship against each other to seal the connection. The connection is broken automatically by the draft forces during uncoupling of the cars. Moreover, the automatic hose connector herein disclosed permits manual coupling to a conventional manually connectable train hose.

IN THE DRAWINGS

DESCRIPTION AND OPERATION

Figure 2:
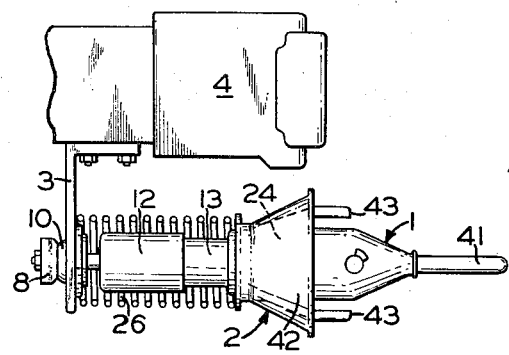
FIG. 2 is an elevational side view, on a smaller scale than FIG. 1, illustrating the mounted disposition of the connector head on a railway car coupler.
Figure 3:
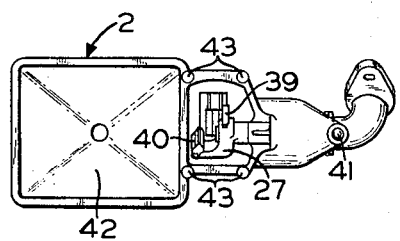
FIG. 3 is an elevational view, on the same scale as FIG. 2, of the automatic hose connector looking down thereon.

As shown in FIG. 2 of the drawings, an automatic hose connector 1 comprises a mating head 2 suspended by a bracket 3 underneath a conventional type railway car coupler 4 carried at one end of the car (not shown) with the axis thereof centrally aligned at the end of the car and parallel to the longitudinal axis of the car.

Figure 1:
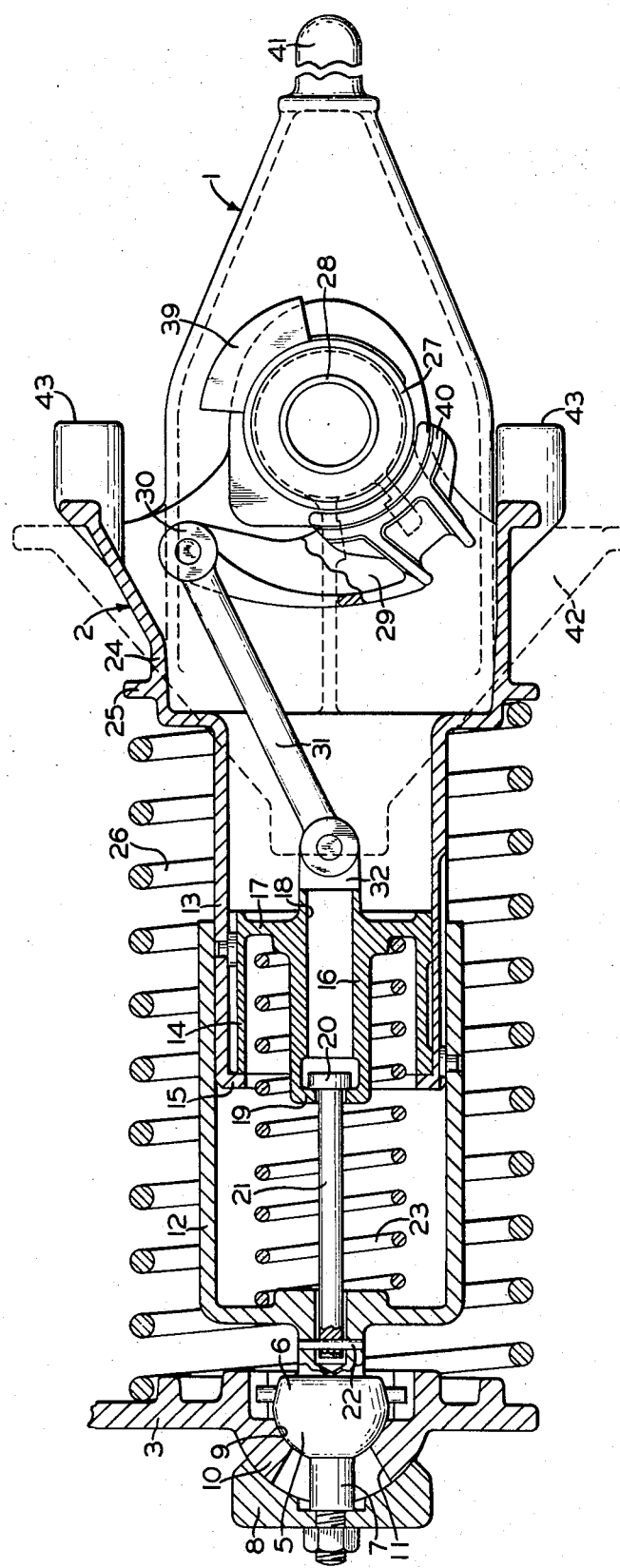
FIG. 1, is an elevational side view, in section, of an automatic hose connector embodying the invention.

As best seen in FIG. 1, the mating head 2 is universally displaceable, with limited movement, about a center point 5 of a ball and socket arrangement comprising a ball 6 secured by a bolt 7 and back plate 8 in a substantially semispherical socket 9 of a correspondingly contoured portion 10 of the bracket 3. Angular displacement of the mating head 2 is limited by abutment of bolt 7 with the inner surface of a circular opening 11 formed coaxially in the contoured portion 10 and through which said bolt extends.

Ball 6 is externally coaxially formed at a closed end of a hollow support cylinder 12, in the other or open end of which a hollow buffer cylinder 13, open end first, is telescopically received. A hollow operating cylinder 14 is coaxially slidably disposed within the buffer cylinder 13, said operating cylinder also having an open end normally abutting against an annular shoulder formed at the open end of said buffer cylinder in the form of a radially inwardly extending flange 15. The operating cylinder 14 is provided with a coaxial central portion 16 extending the length of the cylinder from a closed end 17 opposite the open end of said operating cylinder, said central portion having a coaxial bore 18 therein closed at the end adjacent the closed end of the cylinder. The other end of bore 18 terminates with a constricting radially inwardly extending flange 19 against which a collar 20 formed at one end of a rod 21 normally rests, the other end of said rod being secured by a pin 22 to a neck portion formed coaxially between ball 6 and support cylinder 12.

Flange 19 is biased toward an abutting relation against collar 20 of rod 21 by a spring 23 compressed between the oppositely facing closed ends of support cylinder 12 and operating cylinder 14.

Buffer cylinder 13 forms an axially extending integral portion of a housing 24 in which the mating components of the hose connector are operably disposed. Housing 24 has an external annular collar 25 surrounding the periphery thereof adjacent the end of buffer cylinder 13 opposite the open end bearing flange 15. A spring 26, coaxially surrounding both the support cylinder 12 and buffer cylinder 13, serves to bias said cylinders in opposite axial directions for maintaining them in a normal extended relationship in which flange 15 of said buffer cylinder abuts against the open end of operating cylinder 14. The relative normal positions of cylinders 12, 13, and 14, immediately above defined and in which they are shown in FIG. 1, are the respective positions occupied thereby in the uncoupled disposition of the automatic hose connector. In the uncoupled state of the hose connector 1, therefore, spring 12 serves to retain said hose connector in a normal centrally aligned position.

A connecting member 27 is rotatably mounted in housing 24 such that a sealing gasket 28 carried coaxially thereby lies in a vertical disposition parallel to the longitudinal axis of the car and in position for making sealing contact with a corresponding sealing gasket carried in the counterpart mating head (not shown). Connecting member 27 is provided with a coaxial arcuate arm 29 having one end affixed to the connecting member and the other end pivotally secured to one end 30 of an operating lever 31, the other end of said operating lever being pivotally connected to a boss 32 centrally formed externally of the closed end 17 of operating cylinder 14.

Figure 4:
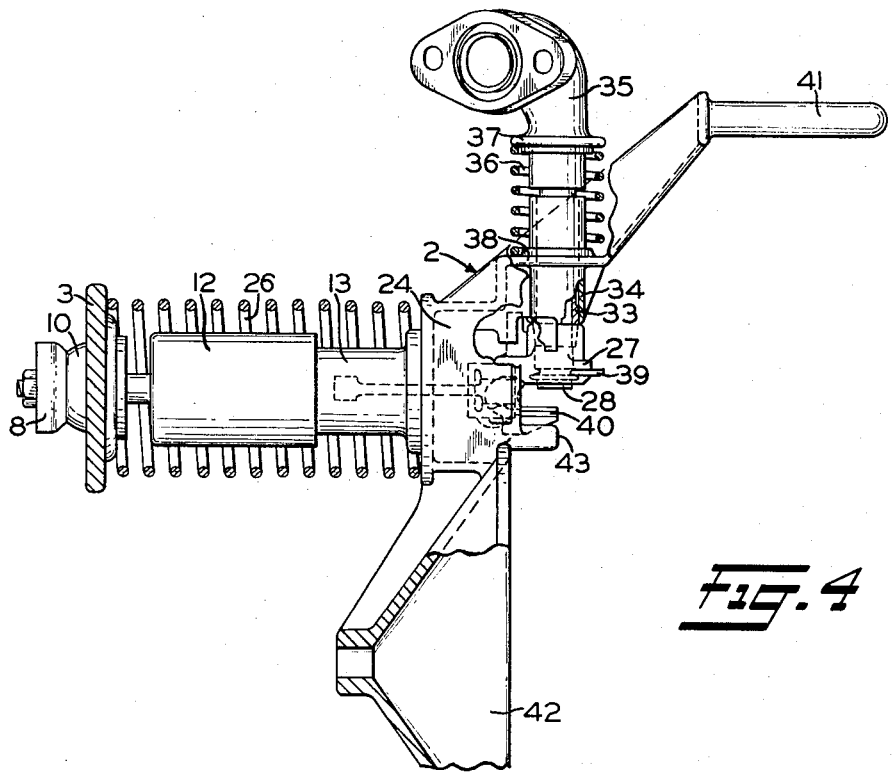
FIG. 4 is a horizontal top view, on a smaller scale than FIG. 1, but larger than FIGS. 2 and 3, of the automatic hose connector.

By referring to FIG. 4, it will be seen that connecting member 27 is supported in housing 24 by a sleeve portion 33 extending axially through a bearing 34 forming a part of said housing and with which said neck portion has a rotational and sliding fit.

The end of sleeve portion 33 opposite the end of connecting member 27 bearing gasket 28, is secured in an adapter 35 by which the train pipe (not shown) is connected to the automatic hose coupler 1. A spring 36 compressed between a collar 37 formed on adapter 35 and a collar or annular shoulder 38 surrounding bearing 34 tends to maintain connecting member 27 and, therefore, sealing gasket 28 slightly displaced from the center plane of the connector so that when two automatic connector heads make initial engagement during coupling thereof, the respective sealing gaskets are kept out of contact with each other until such coupling is completed, as will hereinafter be explained.

The connecting member 27 is provided with a cam lip 39 and a cam shoulder 40, which in conventional and well-known manner cooperate to provide a camming action for causing two facing gaskets 28 to be moved axially toward and into sealing contact with each other when rotated, as will be hereinafter explained, by the coupling action of two mating hose connectors.

The mating head 2, as best seen in FIG. 4, also comprises a guide pin or horn 41 and an oppositely disposed guide cone 42 (the latter being shown in broken outline in FIG. 1), the respective axes of said guide pin and guide cone being equidistant from and on diametrally opposite sides of the vertical centerline of the mating head, said axes both lying in a common horizontal plane. It should be noted that, as shown in FIG. 4 of the drawings, the plane of the drawing in which the view of the automatic hose connector 1 appears, causes the hose connector to be viewed in a disposition rotated 90° from the disposition normally occupied by said hose connector when mounted on the car.

Since a counterpart automatic hose connector would be identical to the automatic hose connector 1 above described, it is not deemed essential to an understanding of the invention that said counterpart hose connector be shown and described, it being understood that the description of operation which follows is applicable to both the mating automatic hose connectors.

In operation, when two cars approach each other for coupling purposes, horn 41 of mating head 2 is gathered by the cone of the counterpart mating head, and vice versa, thus bringing the mating heads into perfect alignment before actual coupling thereof. Since the counterpart mating head operates in identical manner as mating head 2, it will suffice to describe the operation of one only of said mating head, it being understood, of course, that since the counterpart mating head is oppositely disposed, the directions of movements of its several components is opposite to those of the one described.

Initial and subsequent continuing engagement of the mating heads of the hose connectors occurs prior to contact of car coupler 4 with the counterpart car coupler (not shown). During such initial action and subsequently to abutment of a plurality of correspondingly disposed contact pads 43 formed on the frontal face of housing 24 of the mating head 2 with correspondingly disposed contact pads on the counterpart mating head, spring 26 is compressed to allow buffer cylinder 13 to telescope into support cylinder 12.

At the same time spring 23 is also compressed so that the operating cylinder 17 is moved in a direction oppositely to that of buffer cylinder 13. Such movement of operating cylinder 15 in the hose connector 1 shown in FIG. 1, causes movement of lever 31 to the right and clockwise rotation of the connecting end 27, as viewed in said FIG. 1, while the operating cylinder, lever, and connecting end in the counterpart mating head, as was above noted, all move in opposite directions so that during counter rotation of the two connecting ends, the camming action of the cam lips 39 with the respective cam shoulders 40 cause the two oppositely facing gaskets 28 to be brought into sealing contact with each other, against the opposing forces of springs 36 and to be retained in such disposition as long as the cars remain coupled.

It should be apparent that by the coupling action of the hose connectors, as immediately above described, the sealing gaskets 28 are maintained in a spaced apart relationship until the final relative rotating movement of the connecting ends 27 into locking engagement, thereby eliminating unnecessary wear of the gaskets during coupling operation. After the hose connectors are completely coupled, spring 23 is further compressed during final movement of the car couplers into coupled relationship, to thereby insure retention of the connecting ends 27 and sealing gaskets 28 in a locked and sealed condition.

When uncoupling of the cars takes place, the compressed spring 26 causes the buffer cylinder 13 to be extended outwardly of support cylinder 12, so that during the final stages of such extension, flange 19 of operating cylinder 15 is engaged by collar 20 of rod 21, thus causing said operating piston to be retracted toward its normal position to effect unlocking rotation of connecting end 27 relative to the connecting end in the counterpart mating head. During unlocking rotation of the connecting end 27, the compression on spring 36 is relaxed to render said spring effective for withdrawing the sealing gasket 28 away from the counterpart sealing gasket, which, in turn is withdrawn by the corresponding spring in the counterpart mating head. With complete disengagement of connecting end 27 from the counterpart connecting end, the mating heads are free to uncouple automatically as the two cars separate.

The automatic hose connector 1, above described, may also be connected to a conventional or standard train hose by manually lifting the mating head 2, inserting therein the connecting end of the manual hose, and allowing the mating head to return to its normal position. The lip and shoulder portions of the automatic head and the manual connector cooperate in conventional manner for effecting a sealing locked engagement. When uncoupling, disconnection between the automatic hose connector and the manual hose is effected in similar, well-known manner as when two manual type hoses are disconnected by draft forces between the separating cars.

Having now described the invention what we claim as new and desire to secure by Letters Patent, is:

1. An automatic hose connector for a railway car having a car coupler at one end thereof for coupling to a counterpart car coupler of an adjacent car and a train line hose for connection to a counterpart train line hose on the adjacent car, said automatic hose connector comprising:
   a. a mating head having rotatably mounted thereon the connecting end of the train hose of the respective car;
   b. support spring means for flexibly supporting said mating head on the car coupler in an axially aligned position for coupling with a counterpart mating head carried by the counterpart car coupler; and
   c. operating means operable responsively to coupling action of said mating head with the counterpart mating head for effecting rotation of the connecting end of the train line hose in one rotational direction from a disengaged position to an engaged sealing position with the connecting end carried by the counterpart mating head.

2. An automatic hose connector for a railway car, as set forth in claim 1, wherein said mating head comprises a guide pin and a guide cone the axes of which are parallel to the longitudinal axis of the car, are equidistant from the vertical center line of the mating head, and lie in a common horizontal plane passing through the longitudinal axis of the mating head for bringing the mating heads into coupling alignment.

3. An automatic hose connector for a railway car, as set forth in claim 1, wherein said operating means comprises:
   a. lever means connected to said connecting end for causing said rotation thereof;
   b. second spring means compressible by coupling action of the mating head; and
   c. an operating cylinder operably interposed between said second spring means and said lever means and being axially movable in one direction for transmitting the compressive force of said second spring means to said lever means for effecting said rotation of said connecting end.

4. An automatic hose connector for a railway car, as set forth in claim 1, wherein said connecting end comprises:
   a. an annular bearing portion;
   b. a sleeve member coaxially disposed in said bearing portion with a rotative slidable fit;
   c. an annular sealing element coaxially surrounding one end of said sleeve member, the other end of said sleeve member being connected to the train hose,
   d. said connecting end being disposed in the mating head in such a position as to cause said sealing element to be in oppositely facing relation with the sealing element of the connecting end of the counterpart mating head in the coupled relationship of the mating heads.

5. An automatic hose connector for a railway car, as set forth in claim 4, further characterized by biasing means for retaining said sleeve member and the sealing element carried thereon in a limited axial displacement apart from the sealing element on the counterpart mating head during initial coupling action until the mating heads are in their fully coupled relationship.

6. An automatic hose connector for a railway car, as set forth in claim 5, wherein said connecting end is further provided with cam means engageable and cooperative with cam means on the connecting end of the counterpart mating head by said rotation of the connecting ends for camming the oppositely disposed sealing elements into sealing contact with each other against the opposing force of said biasing means.

7. An automatic hose connector for a railway car, as set forth in claim 3, wherein said operating means further comprises retracting means positionally fixed in said mating head and engageable with said operating cylinder during uncoupling of the mating head for effecting axial movement of said operating cylinder in a direction opposite to said one direction and consequent rotation of said connecting end in a rotational direction opposite to said one rotational direction for restoring said connecting end to its said disengaged position.

8. An automatic hose connector for a railway car, as set forth in claim 3, further characterized by:
   a. bracket means for mounting the mating head on the car coupler;
   b. a support cylinder coaxially disposed at one of the mating heads adjacent said bracket means;
   c. ball and socket means for mounting said support cylinder to said bracket means; and
   d. a housing in which said rotatable connecting end, said lever means, and said operating cylinder are housed, said housing having a buffer cylinder portion extending coaxially therefrom and telescopically into said support cylinder,
   e. said support spring means being compressibly coaxially disposed between said bracket means and said housing in externally surrounding relation with said support cylinder for urging said housing in an extending direction out of said support cylinder, and
   f. said operating cylinder being coaxially telescopically operable within said buffer cylinder portion with said second spring means compressibly disposed between said operating cylinder and said support cylinder.

9. An automatic hose connector for a railway car, as set forth in claim 8, wherein said operating means further comprises a rod member disposed coaxially in said support cylinder with one end of said rod secured to the end of said support cylinder adjacent the ball and socket, the other end of said rod being engageable with said operating cylinder such as to provide relative axial movement therebetween during movement of said operating cylinder in its said one direction and to arrest axial movement of said operating cylinder after a certain limited amount of such movement in a direction opposite to said one direction when said operating piston has resumed a normal position in which the connecting end is operated to its said disengaged position.

* * * * *